(12) United States Patent
Sugimoto (10) Patent No.: US 11,709,501 B2
(45) Date of Patent: Jul. 25, 2023

(54) SYSTEM AND METHOD FOR CONTROLLING AN AUTONOMOUS VEHICLE

(71) Applicant: TOYOTA MOTOR NORTH AMERICA, INC., Plano, TX (US)

(72) Inventor: Shingo Sugimoto, Frisco, TX (US)

(73) Assignee: TOYOTA MOTOR NORTH AMERICA, INC., Plano, TX (US)

(*) Notice: Subject to any disclaimer, the term of this patent is extended or adjusted under 35 U.S.C. 154(b) by 921 days.

(21) Appl. No.: 16/276,358

(22) Filed: Feb. 14, 2019

(65) Prior Publication Data

US 2020/0264632 A1    Aug. 20, 2020

(51) Int. Cl.
*G05D 1/02* (2020.01)
*H04L 67/12* (2022.01)

(52) U.S. Cl.
CPC ......... *G05D 1/0287* (2013.01); *G05D 1/0276* (2013.01); *G05D 2201/0213* (2013.01); *H04L 67/12* (2013.01)

(58) Field of Classification Search
CPC .. G05D 1/0287; G05D 1/0289; G05D 1/0276; G05D 2201/0213; G05D 1/0297; G05D 1/0246; B60W 30/16; H04L 67/12
See application file for complete search history.

(56) References Cited

U.S. PATENT DOCUMENTS

| | | | |
|---|---|---|---|
| 9,566,983 B2 | 2/2017 | Harda | |
| 10,032,373 B2 | 7/2018 | Fletcher | |
| 10,395,332 B1* | 8/2019 | Konrardy | G01S 19/485 |
| 10,698,421 B1* | 6/2020 | Harris | H04W 4/40 |
| 2017/0223712 A1 | 8/2017 | Stephens et al. | |
| 2017/0243504 A1* | 8/2017 | Hada | B60W 30/165 |
| 2017/0334441 A1 | 11/2017 | Sen et al. | |
| 2018/0107942 A1* | 4/2018 | Jiang | G08G 1/096775 |
| 2018/0188039 A1 | 7/2018 | Chen et al. | |
| 2018/0231640 A1 | 8/2018 | Han et al. | |
| 2019/0025857 A1* | 1/2019 | Luckevich | G05D 1/0295 |
| 2019/0079659 A1* | 3/2019 | Adenwala | H04W 4/026 |
| 2019/0088135 A1* | 3/2019 | Do | G05D 1/0088 |
| 2019/0129447 A1* | 5/2019 | Tulpule | G05B 13/042 |
| 2019/0206261 A1* | 7/2019 | Szymczak | B60W 30/165 |
| 2019/0232962 A1* | 8/2019 | Broll | B60W 30/16 |
| 2019/0287392 A1* | 9/2019 | Bielby | G08G 1/052 |
| 2019/0308632 A1* | 10/2019 | Chase | B60W 30/10 |
| 2019/0382029 A1* | 12/2019 | Golov | B60T 7/18 |
| 2020/0213581 A1* | 7/2020 | Lu | G06T 7/0004 |
| 2020/0298882 A1* | 9/2020 | Kobayashi | B60W 60/0018 |

* cited by examiner

*Primary Examiner* — Nadeem Odeh
(74) *Attorney, Agent, or Firm* — Oblon, McClelland, Maier & Neustadt, L.L.P.

(57) ABSTRACT

A method, a system, and non-transitory computer readable medium for controlling an autonomous vehicle are provided. The method includes identifying a trend for an autonomous vehicle based on autonomous vehicle profiles associated with one or more vehicles within a network, identifying optimal driving conditions for the autonomous vehicle based on the trend; and controlling one or more subsystems of the autonomous vehicle based on the identified optimal driving conditions.

18 Claims, 5 Drawing Sheets

SYSTEM AND METHOD FOR CONTROLLING AN AUTONOMOUS VEHICLE

BACKGROUND

Cloud computing techniques may be used by vehicle manufacturers to control the flow of autonomous vehicles. U.S. Pat. No. 9,566,983 B2 entitled "Control arrangement arranged to control an autonomous vehicle, autonomous drive arrangement, vehicle and method" by Harda describes a method to control the velocity of an autonomous vehicle based on a preceding vehicle velocity.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

The present disclosure relates to a method for controlling an autonomous vehicle that identifies a trend for an autonomous vehicle based on autonomous vehicle profiles associated with one or more vehicles within a network, identifies optimal driving conditions for the autonomous vehicle based on the trend; and controls one or more subsystems of the autonomous vehicle based on the identified optimal driving conditions.

The present disclosure also relates to a system for controlling an autonomous vehicle. The system includes a network of one or more vehicles and processing circuitry. The processing circuitry is configured to identify a trend for an autonomous vehicle based on autonomous vehicle profiles associated with the one or more vehicles of the network, identify optimal driving conditions for the autonomous vehicle based on the trend, and control one or more subsystems of the autonomous vehicle based on the identified optimal driving conditions.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Referring now to the drawings, wherein like reference numerals designate identical or corresponding parts throughout several views, the following description relates to a system and associated methodology for controlling an autonomous vehicle. The system described herein uses big data and imaging techniques to create a safer driving network of autonomous vehicles. A comprehensive profile of each autonomous vehicle is obtained and leveraged to provide the safer network of autonomous vehicles.

Figure 1:
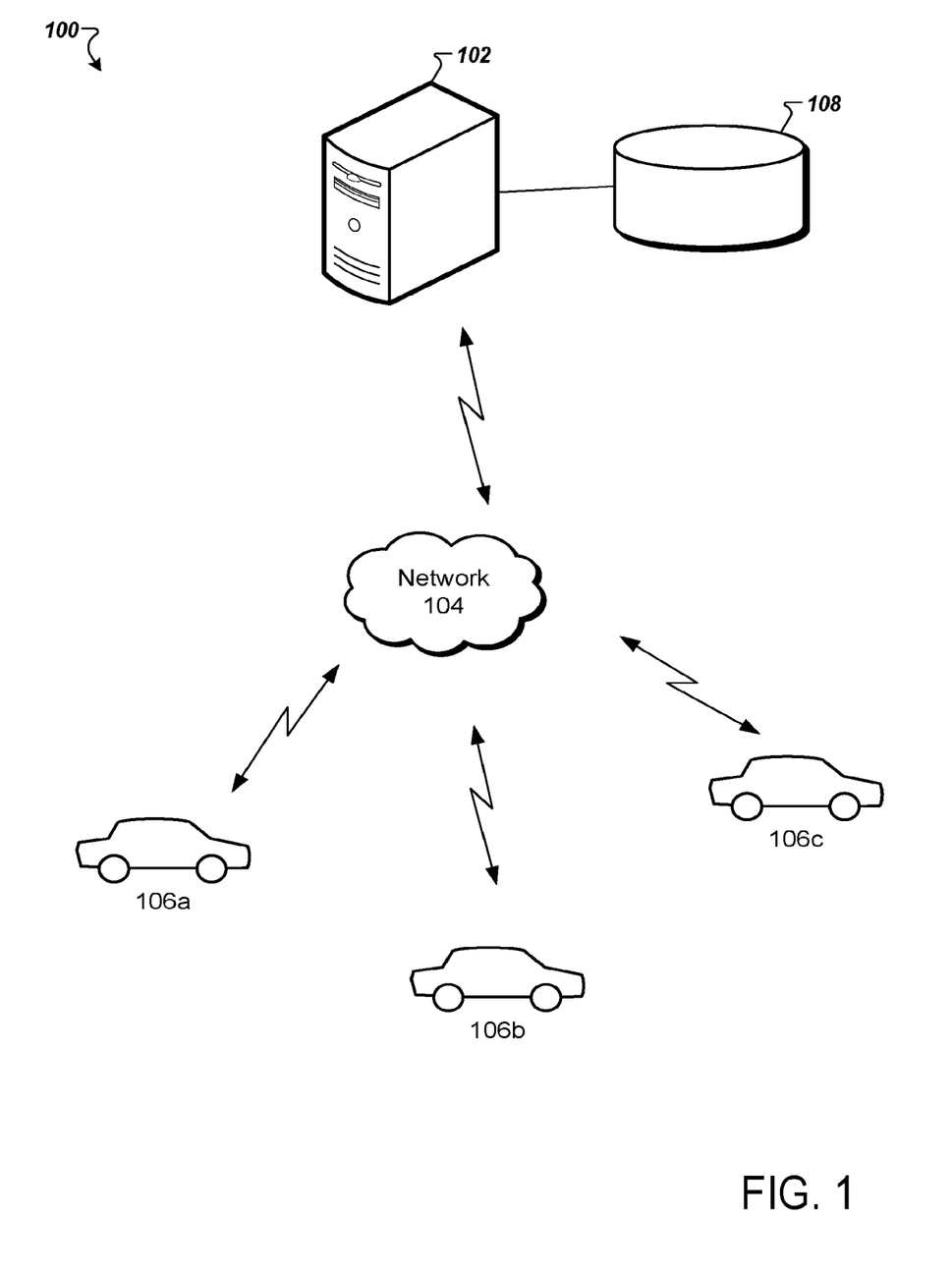
FIG. 1 is a schematic of a system environment according to one example.

FIG. 1 is a schematic of a system environment for the autonomous control system 100, referred to herein as system 100, according to one example. The system 100 includes a server 102, a network 104, a vehicle 106, and a database 108.

Figure 4:
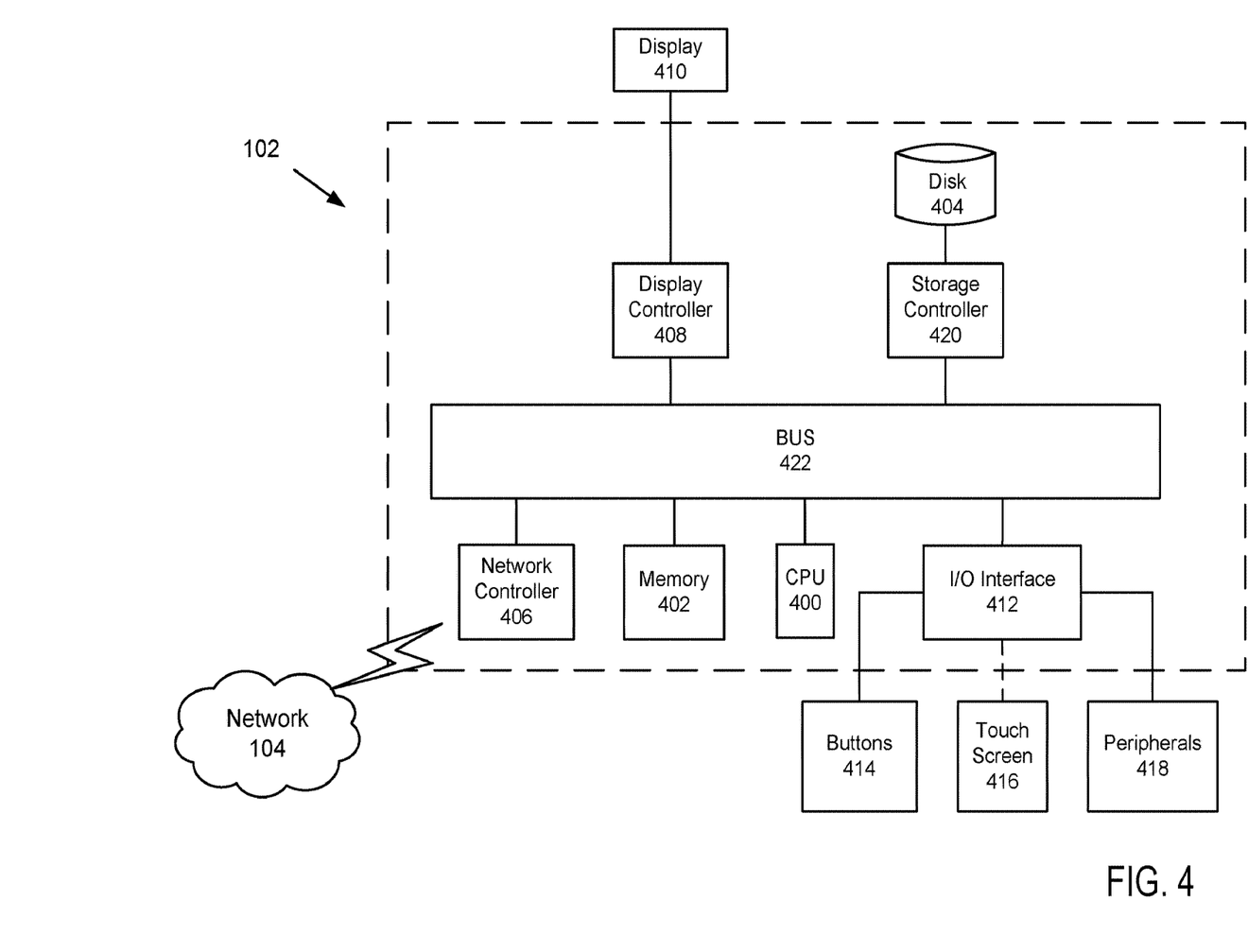
FIG. 4 is a block diagram of a server according to one example.

The server 102 can represent one or more servers connected to the vehicle 106 and the database 108 via the network 104. The server 102 includes processing circuitry configured to perform various processes for the system 100 including receiving data from one or more of the vehicles 106 via the network 104. Additionally, the server 102 outputs control signals and information to one or more of the vehicles 106 and the database 108 via the network 104. The server 102 may control the traffic of autonomous vehicles using cloud computing techniques. The server 102 identifies a trend based on data received from the vehicles in real time. Then, the server 102 sends the control signals to the vehicle 106 to control one or more systems of the vehicle 106 based on the trend. The server 102 may include a CPU 400 and a memory 402 as shown in FIG. 4.

The network 104 can represent one or more networks connecting the vehicle 106, the server 102, and the database 108. Suitable networks can include or interface with any one or more of a local intranet, a PAN (Personal Area Network), a LAN (Local Area Network), a WAN (Wide Area Network), a MAN (Metropolitan Area Network), a VPN (Virtual Private Network), or a SAN (storage area network). Furthermore, communications may also include links to any of a variety of wireless networks, including WAP (Wireless Application Protocol), GPRS (General Packet Radio Service), GSM (Global system for Mobile Communication), CDMA (Code Division Multiple Access) or TDMA (Time Division Multiple Access), cellular phone networks, GPS (Global Positioning System), CDPD (Cellular digit packet data), Bluetooth radio, or an IEEE 802.11 based radio frequency.

The vehicle 106 can represent one or more vehicles 106. FIG. 1 shows vehicles 106a, 106b, 106c. The vehicle 106 may be any type of vehicle such as a car, truck, bus, airplane, helicopter, motorcycle, train, or ship. The vehicle 106 may be gas-powered, diesel powered, ethanol, electric, hybrid, or solar-powered. The vehicle 106 may be actively operated by a driver or may be partially or completely autonomous or self-driving.

The database 108 can represent one or more databases. For example, the database 108 may include a vehicle profiles database, a geographical data database, or a geographical information system (GPS). The database 108 stores the autonomous vehicle profiles generated and/or acquired by the server 102. The database 108 of the system 100 may be implemented in the memory of the server 102. In one implementation, the database 108 may be a cloud based storage system.

The description herein is provided with reference to the system being located and implemented external to the vehicle 106. However, it is to be understood that the system may alternatively or additionally be implemented within the vehicle 106.

A dynamic network of autonomous vehicles is created using big data and imaging techniques. Each vehicle is represented as a dynamic node in the dynamic network of autonomous vehicles. The autonomous vehicles interact with other autonomous vehicles, non-autonomous vehicles, and other objects (i.e., sensors, traffic signs, traffic lights, emergency vehicles, gates, tolls, parking garages, pedestrians, and the like) in a road environment. The autonomous vehicles are connected to the server 102 via the network 104. The server 102 manages communications and interactions within the network of autonomous vehicles. Machine learning techniques (e.g., Neural networks, neuro-fuzzy inference systems, support vector machines, deep learning, and the like) are applied on data obtained from sensors to ascertain optimal driving conditions of each autonomous vehicle within the network of autonomous vehicles. The determined patterns from machine learning are communicated between multiple autonomous vehicles connected via the network 104 to further ascertain, refine, and validate the optimal driving conditions of the autonomous vehicle. For example, the server 102 using machine learning determines patterns of the autonomous vehicles based on: vehicle stability control (VSC)/anti-lock braking system (ABS) activation, duration of VSC/ABS usage, distance between front vehicle parameterization, and vehicle-to-vehicle (V2V) and vehicle-to-center (e.g., 3G, 4G, 5G, and WiFi connected to the Internet or backbone network) communications.

The vehicle 106 may include one or more cameras. A front camera of the vehicle 106 is utilized while analyzing the GPS and point of interest (POI) data for the autonomous vehicles within a preconfigured threshold range. Distances can be determined between the autonomous vehicles in order to distinguish the autonomous vehicles from each other. Using data analytics, the server 102 may determine positions of the autonomous vehicles and changes in the positions of the autonomous vehicles relative to each other. The server 102 identifies distances that correspond to safe distances between the autonomous vehicles (e.g., depending on the relative speed of the two neighboring vehicles, environmental conditions, and the like) to reduce tailgating and promote safer driving practices. The server 102 may control one or more autonomous vehicle systems based on the identified distances for optimal driving conditions. For example, the server 102 may output control signals to control the speeds of vehicles 106a and 106b in order to maintain a safe distance between vehicles 106a and 106b. In one implementation, in response to determining that one or more vehicles are non-autonomous the server 102 may monitor the speed of the non-autonomous vehicles and continuously identify and control the speed of the autonomous vehicle such as to maintain a safe distance between a non-autonomous vehicle and an autonomous vehicle.

The response of the autonomous vehicles to road conditions can be determined from data acquired from sensors included in the autonomous vehicles. Data analytics on the acquired data is used to identify the impact of road conditions (e.g., weather or construction) on the autonomous vehicle, such as whether certain road conditions prevent smooth braking for certain autonomous vehicles. For example, when a road is very slippery due to snow or ice, machine learning accounts for friction and reaction time of the tires to the road. The autonomous vehicle or the server 102 determines that a longer safe distance may be needed between the vehicles 106. A setting parameter of the auto cruise mode is modified to correspond to the longer safe distance.

The server 102 obtains profiles on each autonomous vehicle within the network of autonomous vehicles, for example, via V2V communications. In other embodiments, the obtained profiles are generated by the server 102. The server 102 shares profile information within the network of autonomous vehicles via the network 104 (e.g., 3G, 4G, 5G, and WiFi connections to the Internet or backbone network). A comprehensive profile for each vehicle is determined using edge computing. The comprehensive profiles may include VSC/ABS triggered frequency, position, and date time, outside temperatures obtained by vehicle sensors, and wiper activation conditions.

Front vehicles send information from the vehicle profile to following (i.e., trailing) vehicles. The information sent may include: vehicle weight, brake capability, tire pressure status, speed, and maximum braking gravity set by the autonomous driving system. Furthermore, edge computing in the following vehicles (i.e., trailing vehicles) creates a more comprehensive profile by using: distance from the front vehicle as a numeric value; speed as a numeric value; VSC/ABS activations status; and calculated distances optimized from the front vehicles. For example, if the front vehicle is a sports vehicle that has high braking capability with light weight, then the target distance during autonomous driving from the front vehicle is more than typically allotted. Target distances and safe distances may be stored in the database 108 for each driving profile. In addition, accidents associated with the target distances and safe distances may be uploaded to the server 102. The server 102 may analyze the data and update the target distance associated with a first road condition based on past data including accidents.

Not all vehicles respond the same to road conditions. The profile of each autonomous vehicle may be used to generate a customized response to the road condition as described previously herein. The autonomous vehicles with the aid of machine learning may determine if further information is needed to facilitate more efficient identification or understanding of the effects of a roadway condition on the autonomous vehicle 106. The autonomous vehicle may poll the server 102 to obtain the additional information when needed. For example, the autonomous vehicle may upload a license plate indicia (e.g., alpha numeric characters) to the server 102 with a request for a vehicle type and weight. The server 102 may retrieve from the database 108 the vehicle type and weight by referencing the license plate indicia. Based on the obtained additional information, parameters in the autonomous vehicle are adjusted by, for example, indicating the following distance should be 130% of the standard target distance based on the front vehicle's weight. The weight of the vehicle may be obtained in real time using a vehicle's weight sensor to account for the current weight (i.e., vehicle fully loaded, empty).

The comprehensive profiles are updated and shared continuously based on a predetermined frequency (e.g., one second, one minute, or the like) and/or based on a triggering event (e.g., change to vehicle weight due to loading\unloading). The data contained within the comprehensive profiles are shared directly with other vehicles and/or upload to the server 102. As described previously herein, the server 102 may send data included in the comprehensive profiles to other vehicles. The profiles of autonomous vehicles are used to validate and refine response to road conditions. In one implementation, the server 102 may monitor the distance between vehicles (i.e., stopping distance). The server 102 may compare the distance to a predetermined threshold. In response to determining that the distance is less than the predetermined threshold, the server 102 using machine learning and data analytics may identify an improved response. The server 102 may analyze road and weather conditions associated with the stopping distance. When a first autonomous vehicle stops very close to a second autonomous vehicle on a slippery road, the server 102 may identify an improved response to slippery roads. VSC/traction control system (TSC) triggered information may be used to refine (i.e., improve) the response of the first autonomous vehicle to the slippery roads.

Weather information may be directly obtained from a camera attached to the autonomous vehicle 106. In addition to camera data, additional vehicle sensor information, such as VSC/ABS status and outside temperature sensor data, is used to determine current weather conditions the autonomous vehicle is exposed to. The server 102 may also send to the autonomous vehicle 106 weather information from a third party or other vehicles or sensors in the vicinity of the autonomous vehicle.

Figure 2:
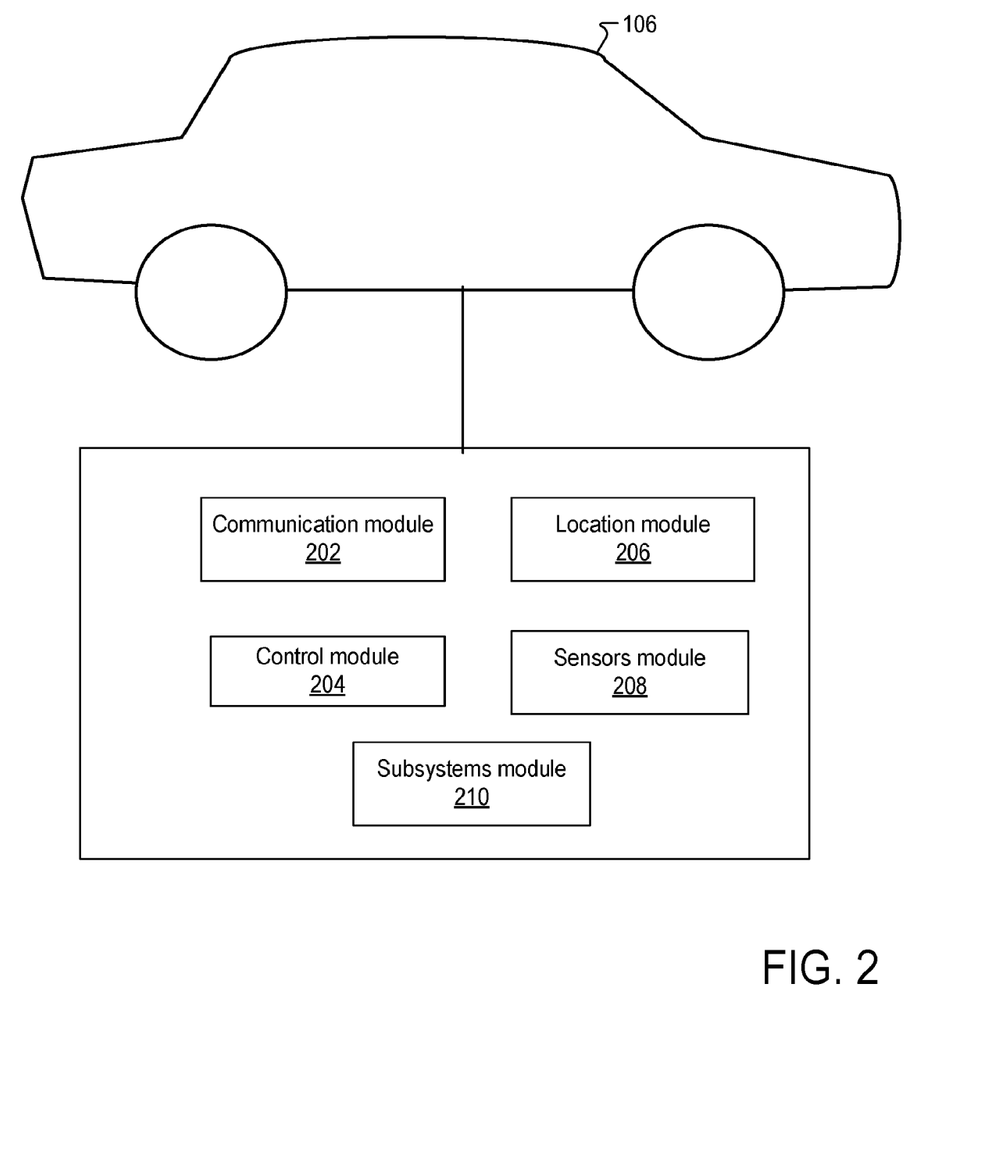
FIG. 2 is a block diagram of a system for controlling a vehicle according to one example.

FIG. 2 is a block diagram of a vehicle 106 according to one example. The vehicle 106 may include a communication module 202, a control module 204, a location module 206, a sensors module 208, and a subsystems module 210. The communication module 202 may be a direct communication module (DCM) that provides communications over a network to any server that may be included with multiple services available to the vehicle user, for example, the server 102. The control module 204 may control one or more subsystems of the subsystems module 210. The location module 206 may include positioning circuitry to determine the geographical location of the vehicle 106. The sensors module 208 may include one or more cameras, a temperature sensor, a weight sensor, and the like. For example, the sensors module 208 may include a front camera and a rear camera.

The modules described herein may be implemented as either software and/or hardware modules and may be stored in any type of computer-readable medium or other computer storage device. For example, each of the modules described herein may be implemented in circuitry that is programmable (e.g. microprocessor-based circuits) or dedicated circuits such as application specific integrated circuits (ASICS) or field programmable gate arrays (FPGAS). In one embodiment, a central processing unit (CPU) could execute software to perform the functions attributable to each of the modules described herein. The CPU may execute software instructions written in a programming language such as Java, C, or assembly. One or more software instructions in the modules may be embedded in firmware, such as an erasable programmable read-only memory (EPROM).

Figure 3:
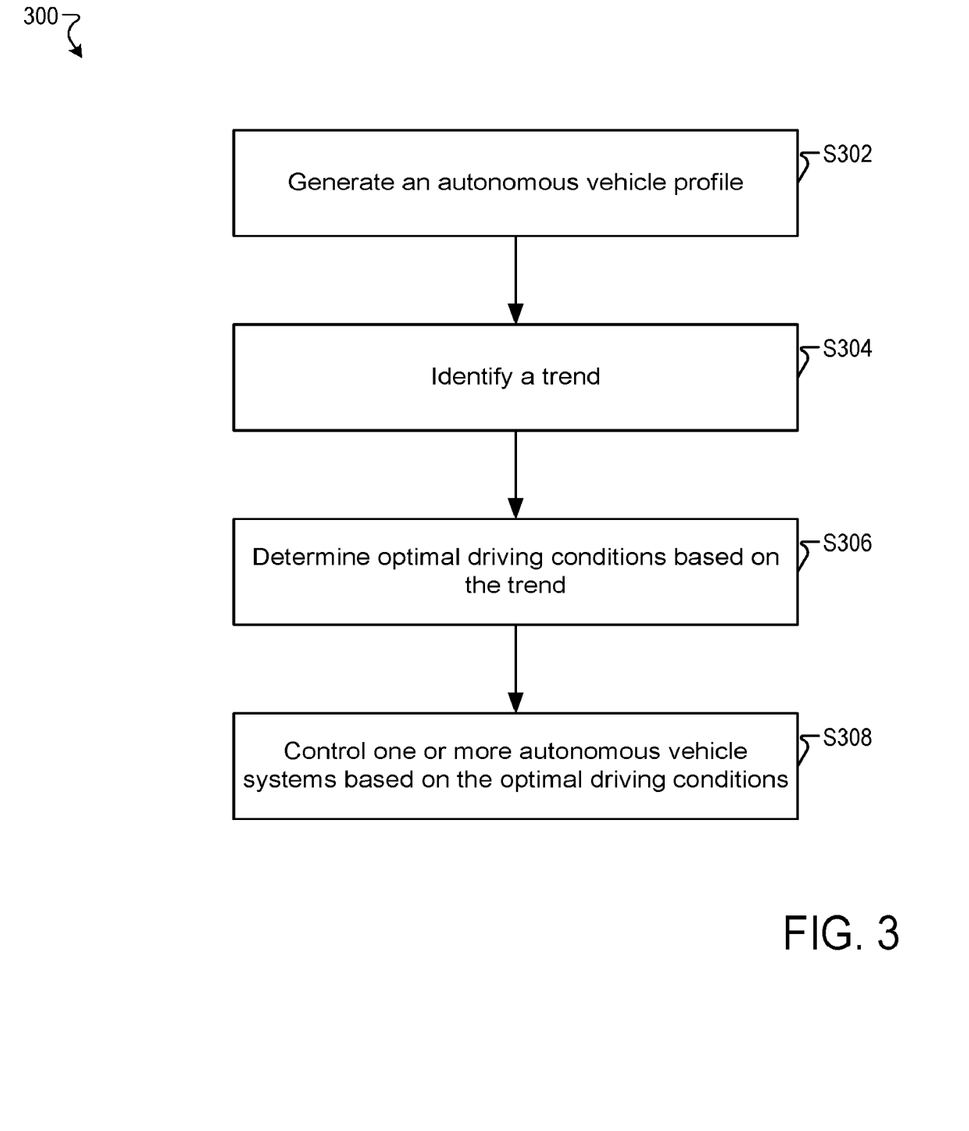
FIG. 3 is a flowchart for a process for controlling the vehicle according to one example.

FIG. 3 is a flowchart for a method 300 for controlling the vehicle 106 according to one example.

At S302, the server 102 may generate an autonomous vehicle profile based on driving data and environmental data acquired from the autonomous vehicle. In one implementation, the autonomous vehicle may generate the autonomous vehicle profile based on the driving and environmental data. The autonomous vehicle shares the autonomous vehicle profile with the server 102 and/or other vehicles 106 via the network 104. The server 102 may acquire the autonomous vehicle profiles at preset time intervals. For example, the server 102 may poll the vehicle 106 to upload the autonomous vehicle profile every 15 minutes. In other implementations, the vehicle 106 may upload the vehicle profiles at preset time intervals.

In one implementation, a first vehicle may share the autonomous vehicle profile (associated with the first vehicle) with vehicles within a predetermined distance when a connection to the server 102 fails (e.g., in a tunnel).

At S304, the server 102 may identify a trend for one or more autonomous vehicles based on the autonomous vehicle profiles received from one or more vehicles. The autonomous vehicle profiles include sensor data as described previously herein. The trend may include short stopping distance, an increase in lane change, and the like.

At S306, the server 102 may determine optimal driving conditions based on the trend. For example, the server 102 may identify a safe distance between two vehicles based on the trend. For example, in response to determining that the vehicles are stopping at a close distance between each other (e.g., below a predetermined threshold), the server 102 may increase the target stopping distance. In one example, the server 102 may decrease the traveling speed when the vehicles are changing lanes often to avoid obstacles.

At S308, the server 102 may send control signals to the autonomous vehicle based on the determined optimal driving conditions. For example, the server 102 may send control signals to the control module 204. In turn, the control module 204 may modify one or more settings of the subsystems module 210 based on the control signals.

Although the flowcharts show specific orders of executing functional logic block, the order of executing the blocks may be changed relative to the order shown, as will be understood by one of ordinary skill in the art. Also, two or more blocks shown in succession may be executed concurrently or with partial concurrence.

A system which includes the features in the foregoing description provides numerous advantages to users. In particular, safety of autonomous vehicle networks is improved. Settings of one or more subsystems of the autonomous vehicle are automatically adjusted based on an identified trend.

Next, a hardware description of the server 102 according to exemplary embodiments is described with reference to FIG. 4. In FIG. 4, the server 102 includes a CPU 400 which performs the processes described herein. The process data and instructions may be stored in memory 402. These processes and instructions may also be stored on a storage medium disk 404 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 426 communicates, such as a server or computer.

Further, the claimed advancements may be provided as a utility application, background daemon, or component of an operating system, or combination thereof, executing in conjunction with CPU 400 and an operating system such as Microsoft® Windows®, UNIX®, Oracle® Solaris, LINUX®, Apple macOS® and other systems known to those skilled in the art.

In order to achieve the server 102, the hardware elements may be realized by various circuitry elements, known to those skilled in the art. For example, CPU 400 may be a Xenon® or Core® processor from Intel Corporation of America or an Opteron® processor from AMD of America, or may be other processor types that would be recognized by one of ordinary skill in the art. Alternatively, the CPU 400 may be implemented on an FPGA, ASIC, PLD or using discrete logic circuits, as one of ordinary skill in the art would recognize. Further, CPU 400 may be implemented as multiple processors cooperatively working in parallel to perform the instructions of the inventive processes described above.

The server 102 in FIG. 4 also includes a network controller 406, such as an Intel Ethernet PRO network interface card from Intel Corporation of America, for interfacing with network 104. As can be appreciated, the network 104 can be a public network, such as the Internet, or a private network such as LAN or WAN network, or any combination thereof and can also include PSTN or ISDN sub-networks. The network 104 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The server 102 further includes a display controller 408, such as a NVIDIA® GeForce® GTX or Quadro® graphics adaptor from NVIDIA Corporation of America for interfacing with display 410, such as a Hewlett Packard® HPL2445w LCD monitor. A general purpose I/O interface 412 interfaces with a keyboard and/or mouse 414 as well as an optional touch screen panel 416 on or separate from display 410. General purpose I/O interface also connects to a variety of peripherals 418 including printers and scanners, such as an OfficeJet® or DeskJet® from Hewlett Packard®.

The general purpose storage controller 420 connects the storage medium disk 404 with communication bus 422, which may be an ISA, EISA, VESA, PCI, or similar, for interconnecting all of the components of the server 102. A description of the general features and functionality of the display 410, keyboard and/or mouse 414, as well as the display controller 408, storage controller 420, network controller 406, and general purpose I/O interface 412 is omitted herein for brevity as these features are known.

Figure 5:
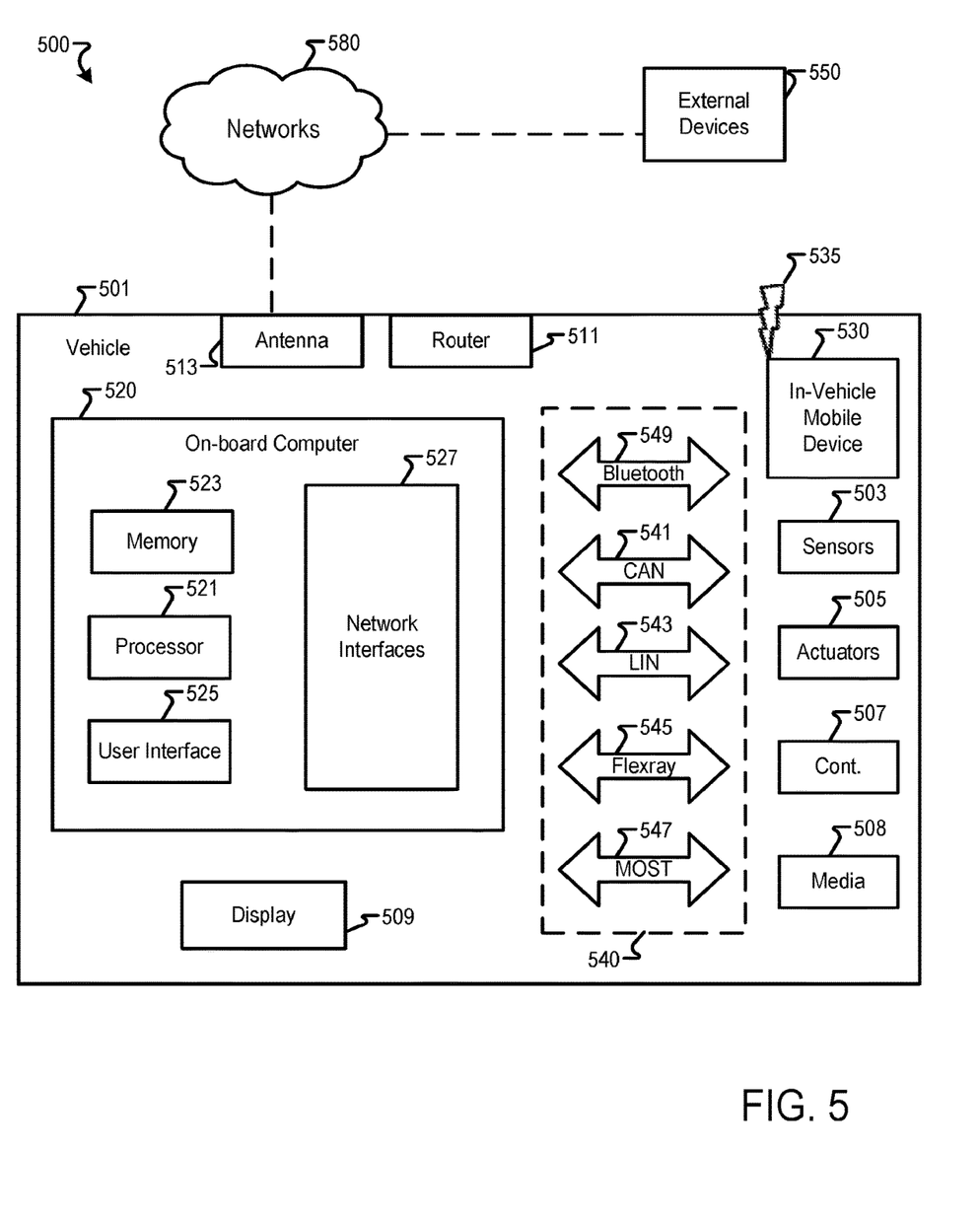
FIG. 5 is a block diagram of a vehicle according to one example.

FIG. 5 is a simplified block diagram of a vehicle environment 500 in which embodiments of the invention disclosed herein may be implemented. The vehicle environment 500 includes a vehicle 501 in communication with one or more external devices 550 by way of one or more external networks 580. Vehicle 501 also includes various internal networks 540 for interconnecting several vehicle devices within the vehicle as will be discussed below. The vehicle environment 500 may also include one or more in-vehicle mobile device 530. External devices 550 include any device located outside the vehicle 501 such that the external device must communicate with the vehicle and its devices by an external network 580. For example, the external devices may include mobile devices, electronic devices in networked systems (e.g., servers or clients in a local area network (LAN), etc.), on board computers of other vehicles etc. In-vehicle mobile devices 530 are devices which are located within, or in the vicinity of the vehicle 501 such that the in-vehicle mobile device can communicate directly with internal networks 540 of the vehicle 501. In-vehicle mobile devices 530 may also connect with external networks 580.

Vehicle 501 includes vehicle devices integral with or otherwise associated with the vehicle 501. In the embodiment of FIG. 5, vehicle devices include one or more sensors 503, one or more actuators 505, one or more control units 507, one or more media systems 508, one or more displays 509, one or more routers 511, one or more antenna 513, and one or more on board computers 520. As used herein, the term "vehicle device" is meant to encompass sensors, actuators, controllers, electronic control units (ECUs), detectors, instruments, embedded devices, media devices including speakers, a CD and/or DVD player, a radio, vehicle navigation systems (e.g., GPS) displays, other peripheral or auxiliary devices or components associated with the vehicle 501.

Sensors 503 detect various conditions within (or in the immediate vicinity of) the vehicle 501. For example, sensors 503 may be temperature sensors, photosensors, position sensors, speed sensors, angle sensors or any other sensor for detecting a diagnostic condition or other parameter of the vehicle 501 or its ambient environment. Sensors 503 may be passive or "dumb" sensors that provide an analog representative of the sensed parameter, or so called "smart" sensors with integrated memory and digital processing capability to analyze the parameter sensed within the sensor itself.

On-board computer 520 is a vehicle device for providing general purpose computing functionality within the vehicle 501. The on-board computer 520 typically handles computationally intensive functions based on software applications or "apps" loaded into memory. On-board computer 520 may also provide a common interface for different communication networks in the vehicle environment 500. On-board computer 520 includes one or more processor 521, one or more memory 523, one or more user interface 525, and one or more network interface 527.

Multiple internal vehicle networks represented by 540 may exist in the vehicle 501 to provide communication pathways to various vehicle devices distributed throughout the vehicle 501. An internal vehicle network 540 is a collection of nodes, such as vehicle devices, integrated with or otherwise linked to the vehicle and interconnected by communication means. FIG. 5 shows four examples of such hard wired networks: Controller Area Network (CAN) 541, Local Internet Network (LIN) 543, Flexray bus 545, and Media Oriented System Transport (MOST) network 547.

Other hard wired internal networks such as Ethernet may be used to interconnect vehicle devices in the vehicle 501.

Further, internal wireless networks 549, such as near field communications, Bluetooth, etc. may interconnect vehicle devices.

Users (driver or passenger) may initiate communication in vehicle environment 500 via some network, and such communication may be initiated through any suitable device such as, in-vehicle mobile device 530, display 509, user interface 525, or external devices 550.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for controlling an autonomous vehicle, the method comprising:
    identifying, using processing circuitry that implements a neural network, a trend for the autonomous vehicle based on an autonomous vehicle profile of the autonomous vehicle and autonomous vehicle profiles associated with one or more other vehicles within a network;
    identifying optimal driving conditions for the autonomous vehicle based on the trend; and
    controlling one or more subsystems of the autonomous vehicle based on the identified optimal driving conditions,
    wherein the autonomous vehicle profile of the autonomous vehicle includes at least stability control activation data.

2. The method of claim 1, further comprising:
    acquiring driving data and environmental data from the autonomous vehicle; and
    determining the autonomous vehicle profile for the autonomous vehicle based on the driving data and the environmental data.

3. The method of claim 1, further comprising:
    polling the autonomous vehicle to upload an autonomous vehicle profile thereof at preset time intervals.

4. The method of claim 1, further comprising:
    receiving from the autonomous vehicle a request for additional information;
    retrieving the requested additional information from a database; and
    outputting the requested additional information to the autonomous vehicle.

5. The method of claim 4, wherein the request includes a license plate indicia.

6. The method of claim 1, wherein the autonomous vehicle profile of the autonomous vehicle further includes at least one of braking system activation data, distance between front vehicle parameterization, and environmental conditions.

7. The method of claim 1, wherein determining the optimal driving conditions includes:
    identifying a target distance between two autonomous vehicles.

8. The method of claim 1, further comprising:
    acquiring from a first vehicle data including at least one of a vehicle speed, a vehicle weight, a tire pressure status, and a maximum braking gravity; and
    outputting to a second vehicle the data, wherein the second vehicle is trailing the first vehicle.

9. The method of claim 8, further comprising:
    analyzing the data; and
    increasing a target distance between the first vehicle and the second vehicle when the data indicates that the first vehicle has a high braking capability.

10. A system for controlling an autonomous vehicle, the system comprising:
    a network connecting one or more vehicles; and
    processing circuitry configured to
        identify, using a neural network, a trend for the autonomous vehicle based on an autonomous vehicle profile of the autonomous vehicle and autonomous vehicle profiles associated with the one or more vehicles,
        identify optimal driving conditions for the autonomous vehicle based on the trend, and
        control one or more subsystems of the autonomous vehicle based on the identified optimal driving conditions,
    wherein the autonomous vehicle profile of the autonomous vehicle includes at least stability control activation data.

11. The system of claim 10, wherein the processing circuitry is further configured to:
    acquire driving data and environmental data from the autonomous vehicle; and
    determine the autonomous vehicle profile of the autonomous vehicle based on the driving data and the environmental data.

12. The system of claim 10, wherein the processing circuitry is further configured to:
    poll the autonomous vehicle to upload an autonomous vehicle profile thereof at preset time intervals.

13. The system of claim 10, wherein the processing circuitry is further configured to:
    receive from the autonomous vehicle a request for additional information;
    retrieve the requested additional information from a database; and
    output the requested additional information.

14. The system of claim 13, wherein the request includes a license plate indicia.

15. The system of claim 10, wherein the autonomous vehicle profile of the autonomous vehicle further includes at least one of braking system activation data, distance between front vehicle parameterization, and environmental conditions.

16. The system of claim 10, wherein the processing circuitry is further configured to:
    identify a target distance between two autonomous vehicles.

17. The system of claim 10, wherein the processing circuitry is further configured to:
    acquire from a first vehicle data including at least one of a vehicle speed, a vehicle weight, a tire pressure status, and a maximum braking gravity; and
    output to a second vehicle the data, wherein the second vehicle is trailing the first vehicle.

18. A non-transitory computer readable medium storing computer-readable instructions therein which when executed by a computer cause the computer to perform a method for controlling an autonomous vehicle, the method comprising:
- identifying, using a neural network, a trend for the autonomous vehicle based on an autonomous vehicle profile of the autonomous vehicle and on autonomous vehicle profiles associated with one or more vehicles within a network;
- identifying optimal driving conditions for the autonomous vehicle based on the trend; and
- controlling one or more subsystems of the autonomous vehicle based on the identified optimal driving conditions,
- wherein the autonomous vehicle profile of the autonomous vehicle includes at least stability control activation data.

* * * * *